United States Patent
Matsumoto (10) Patent No.: US 11,316,994 B2
(45) Date of Patent: Apr. 26, 2022

(54) SHEET DISCHARGING APPARATUS, IMAGE READING APPARATUS, AND IMAGE FORMING APPARATUS

(71) Applicant: CANON KABUSHIKI KAISHA, Tokyo (JP)

(72) Inventor: Akira Matsumoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 16/883,018

(22) Filed: May 26, 2020

(65) Prior Publication Data

US 2020/0382668 A1  Dec. 3, 2020

(30) Foreign Application Priority Data

May 31, 2019  (JP) .............................. JP2019-102797

(51) Int. Cl.
*H04N 1/00* (2006.01)
*B65H 31/20* (2006.01)
*B65H 29/14* (2006.01)

(52) U.S. Cl.
CPC ......... *H04N 1/00631* (2013.01); *B65H 29/14* (2013.01); *B65H 31/20* (2013.01);
(Continued)

(58) Field of Classification Search
CPC ............... B65H 29/14; B65H 31/20; B65H 2301/42262; B65H 29/22; B65H 31/3027;
(Continued)

(56) References Cited

U.S. PATENT DOCUMENTS

| 5,377,966 | A | * | 1/1995 | Ohmori | .................. | B65H 31/20 271/223 |
| 8,837,019 | B2 | * | 9/2014 | Matsumoto | ........ | H04N 1/00615 358/498 |

(Continued)

FOREIGN PATENT DOCUMENTS

| JP | 2006-082919 A | 3/2006 |
| JP | 2017-109814 A | 6/2017 |

OTHER PUBLICATIONS

European Search Report dated Dec. 14, 2020, in related European Patent Application No. 20176443.8.
Akira Matsumoto, U.S. Appl. No. 16/881,207, filed May 22, 2020.

*Primary Examiner* — Negussie Worku
(74) *Attorney, Agent, or Firm* — Venable LLP (57) ABSTRACT

A sheet discharging apparatus includes a discharge unit and a stacking portion. The stacking portion includes a first supporting portion including a first part and a second part provided with an interval therebetween in a width direction of the sheets, and configured to support a first sheet having a width larger than the interval between the first part and the second part, and a second supporting portion provided at a position between the first part and the second part in the width direction and below the first supporting portion in a gravity direction, and configured to support a second sheet having a width smaller than the interval. The second supporting portion includes a recess portion where the second supporting portion is recessed in the gravity direction to be lower than a height at which the second supporting portion comes into contact with a lower surface of the second sheet.

14 Claims, 8 Drawing Sheets

(52) U.S. Cl.
CPC ..... *H04N 1/00559* (2013.01); *H04N 1/00602* (2013.01); *H04N 1/00604* (2013.01)

(58) Field of Classification Search
CPC ........ B65H 33/14; B65H 39/10; B65H 9/106; G03G 15/605; G03G 15/6552; H04N 1/00559; H04N 1/00602; H04N 1/00604; H04N 1/00631
USPC ........................................................ 358/498
See application file for complete search history.

(56) References Cited

U.S. PATENT DOCUMENTS

| | | | |
|---|---|---|---|
| 2005/0230898 A1* | 10/2005 | Suqiyama | G03G 15/6552 270/58.08 |
| 2011/0310206 A1* | 12/2011 | Samoto | B41J 29/02 347/104 |
| 2016/0325951 A1* | 11/2016 | Shiohara | B65H 1/266 |
| 2018/0024490 A1* | 1/2018 | Takeuchi | B65H 31/20 271/213 |
| 2019/0033769 A1* | 1/2019 | Shiina | B65H 29/125 |

* cited by examiner

SHEET DISCHARGING APPARATUS, IMAGE READING APPARATUS, AND IMAGE FORMING APPARATUS

BACKGROUND OF THE INVENTION

Field of the Invention

The present invention relates to a sheet discharging apparatus that discharges a sheet, an image reading apparatus that reads image information from a sheet, and an image forming apparatus that forms an image on a sheet.

Description of the Related Art

An image reading apparatus incorporated in an image forming apparatus such as a copier or a multifunctional apparatus includes an auto document feeder: ADF that automatically feeds one sheet at a time serving as a document. A sheet fed by the ADF is supported on a discharge tray after image information thereof is read by an image sensor.

In recent years, also for sheets having a size smaller than a regular size such as an A4 size, there has been a demand for automatically feeding a sheet by an ADF and reading image information. According to this, there has been a demand that sheets stacked on a discharge tray are precisely aligned also in the case of feeding sheets of a small size by an ADF. Japanese Patent Laid-Open No. 2017-109814 discloses a configuration in which a sub tray corresponding to A6 size sheets or post cards is attachable to and detachable from a discharge tray of an ADF.

However, in the configuration of Japanese Patent Laid-Open No. 2017-109814, a user has to attach and detach a sub tray in accordance with the size of sheets, and a space for storing the detached sub tray needs to be provided, which leaves a room for improvement in terms of convenience.

SUMMARY OF THE INVENTION

The present invention provides a sheet discharging apparatus, an image reading apparatus and an image forming apparatus that can achieve improvement in convenience while maintaining alignment of sheets of various sizes.

According to one aspect of the invention, a sheet discharging apparatus includes: a discharge unit configured to discharge a sheet in a discharge direction; and a stacking portion on which sheets discharged by the discharge unit are stacked. The stacking portion includes: a first supporting portion including a first part and a second part provided with an interval therebetween in a width direction of the sheets, and configured to support a first sheet having a width in the width direction larger than the interval between the first part and the second part, the width direction intersecting with the discharge direction; and a second supporting portion provided at a position between the first part and the second part in the width direction and below the first supporting portion in a gravity direction, and configured to support a second sheet having a width in the width direction smaller than the interval between the first part and the second part. The second supporting portion includes a recess portion where the second supporting portion is recessed in the gravity direction to be lower than a height at which the second supporting portion comes into contact with a lower surface of the second sheet.

Further features of the present invention will become apparent from the following description of exemplary embodiments with reference to the attached drawings.

DESCRIPTION OF THE EMBODIMENTS

An exemplary embodiment of the present invention will be described below with reference to the drawings.

Figure 1:
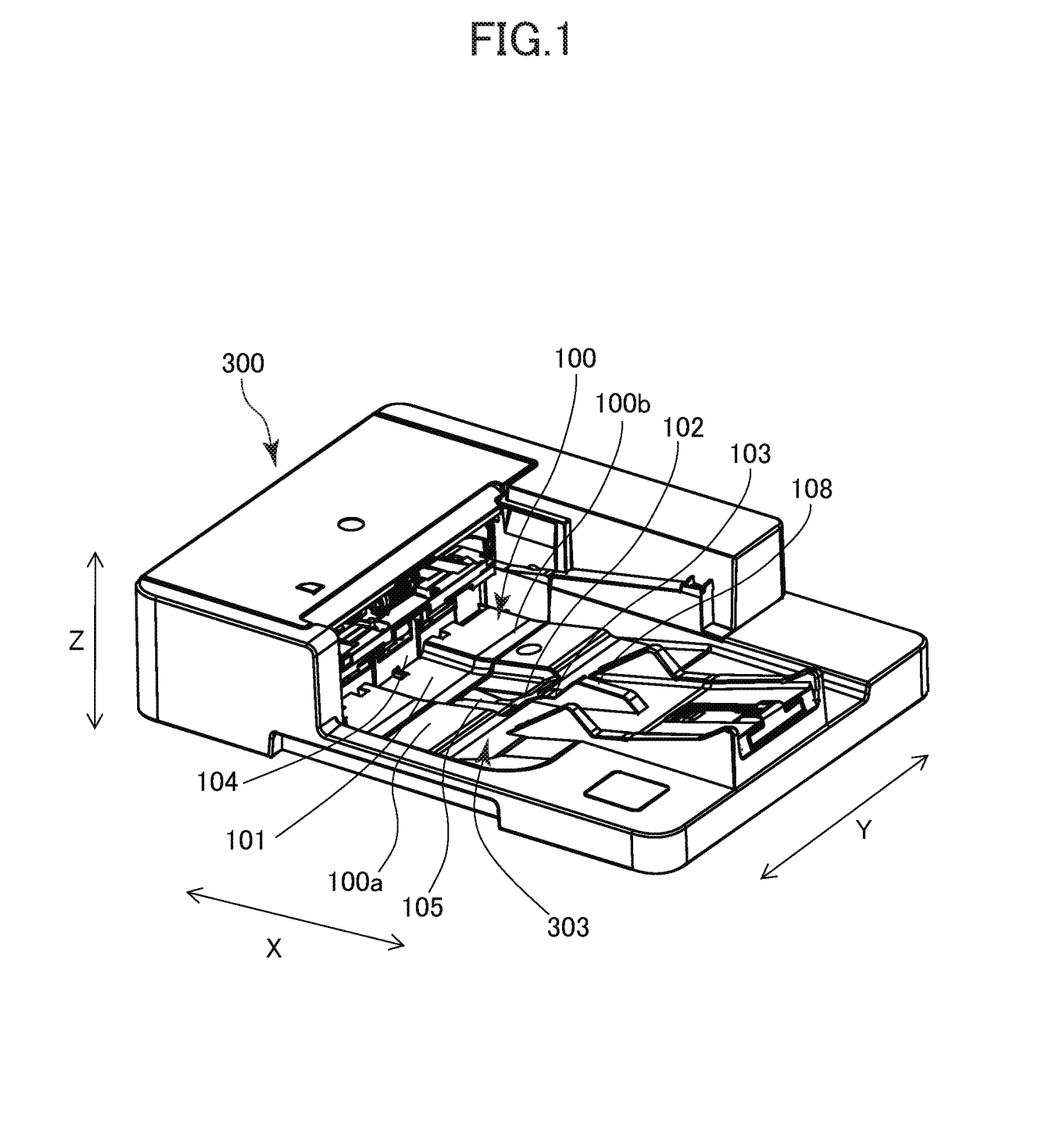
FIG. 1 is a perspective view of a discharge tray of an ADF according to an exemplary embodiment.
Figure 2:
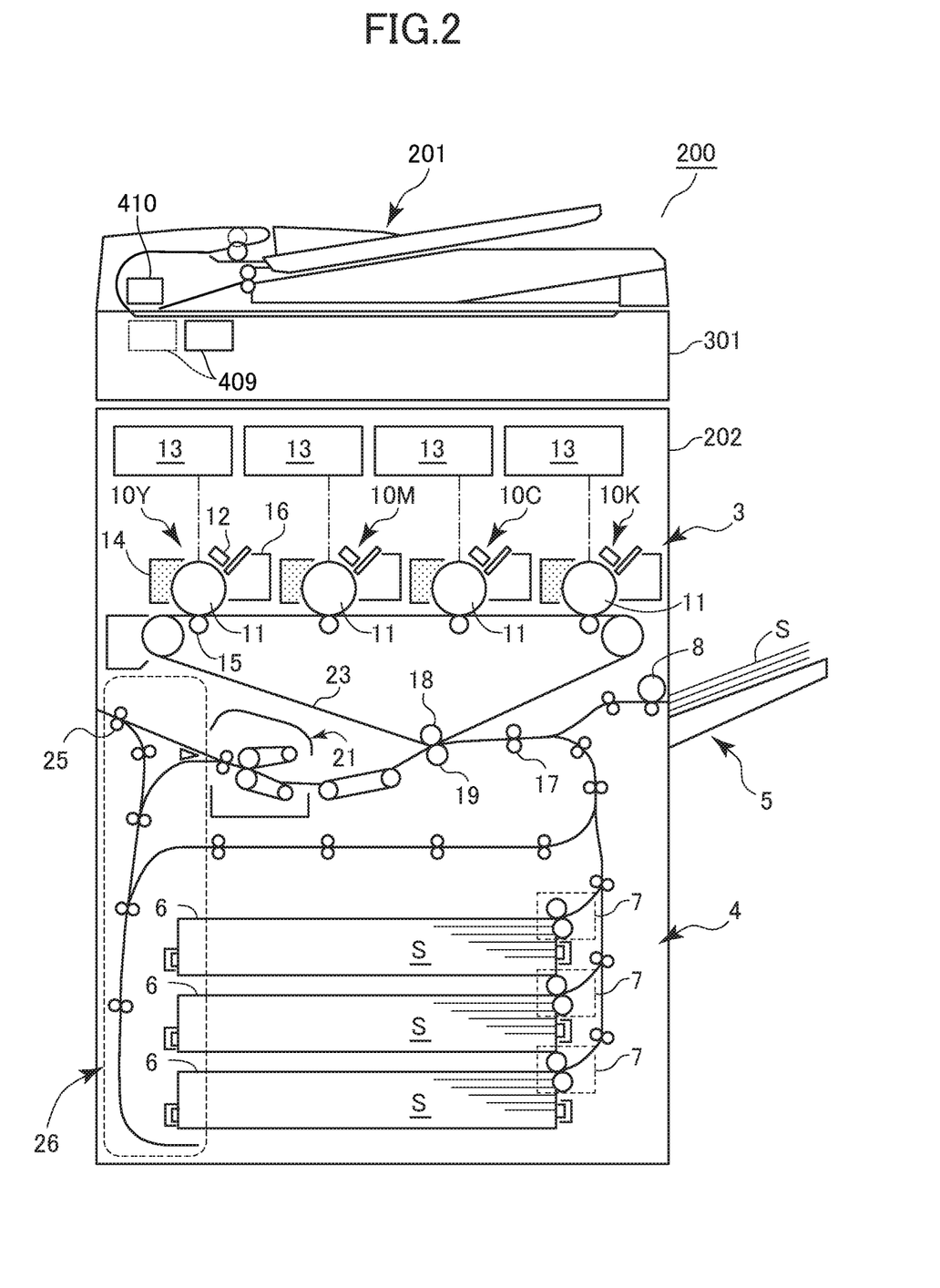
FIG. 2 is a diagram schematically illustrating an image forming apparatus according to the exemplary embodiment.
Figure 3:
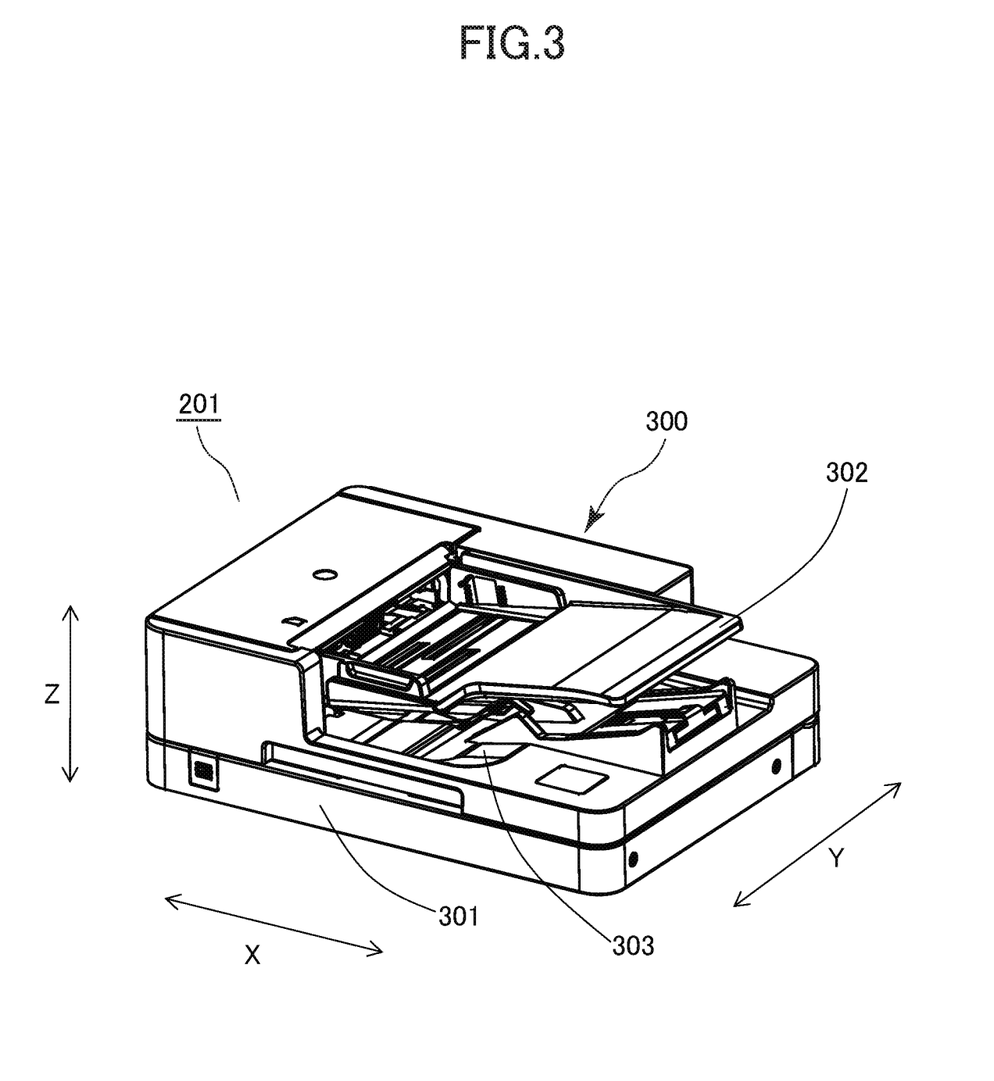
FIG. 3 is a diagram schematically illustrating an image reading apparatus according to the exemplary embodiment.
Figure 4:
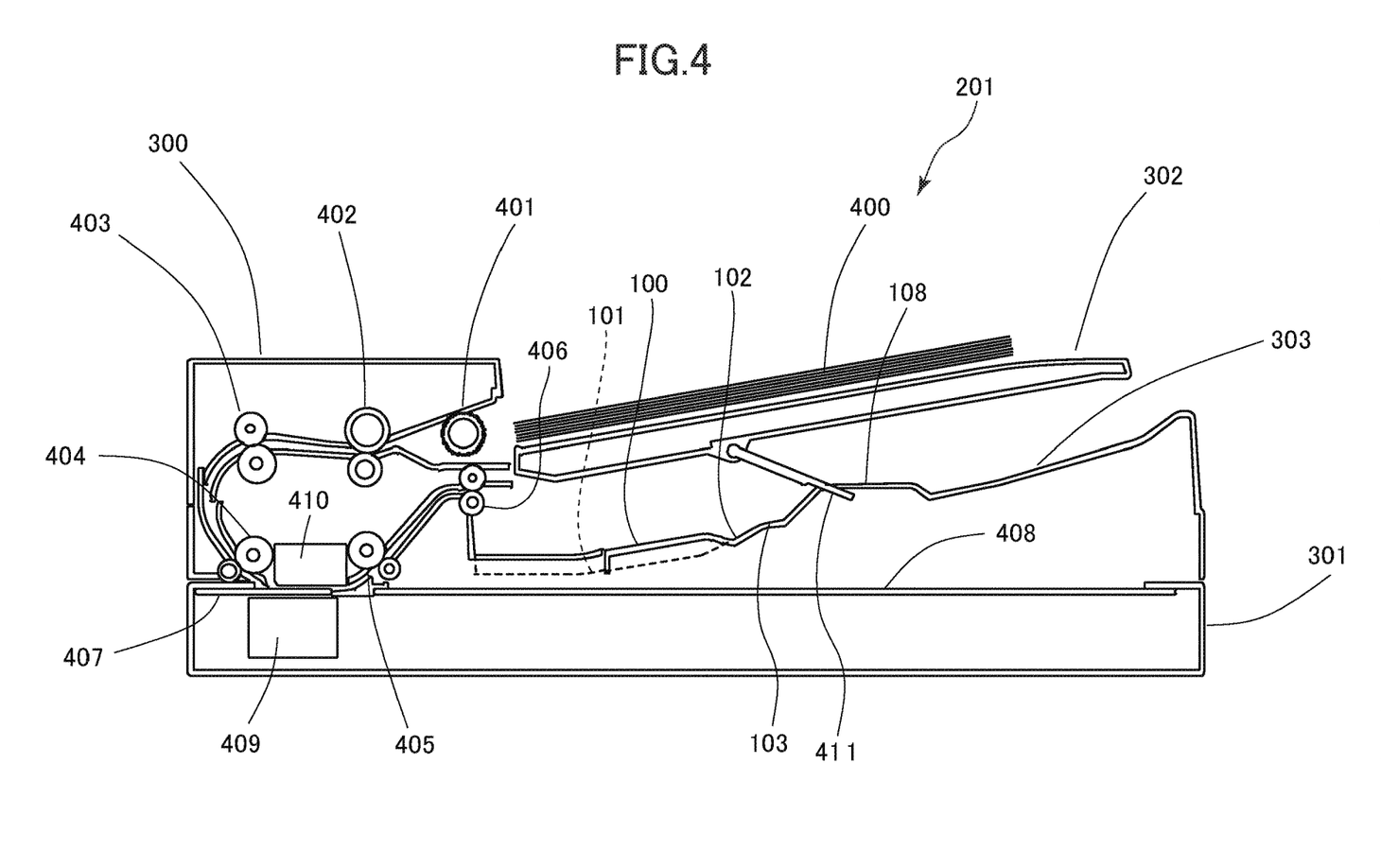
FIG. 4 is a section view of the image reading apparatus according to the exemplary embodiment.

FIG. 1 is a perspective view of an ADF 300 according to an exemplary embodiment of the present disclosure. To be noted, in FIG. 1, illustration of a feed tray is omitted such that a discharge tray 303 is visible. FIG. 2 is a schematic view of an image forming apparatus 200 including an image reading apparatus 201. FIG. 3 is a schematic view of the ADF 300 and a reader portion 301 constituting the image reading apparatus 201. FIG. 4 is a diagram illustrating a sectional configuration of the image reading apparatus 201.

Image Forming Apparatus

First, a schematic configuration of the image forming apparatus 200 of an electrophotographic system including the image reading apparatus 201 will be described with reference to FIG. 2. To be noted, the image forming apparatus 200 is merely an example of an image forming apparatus, and examples of image forming apparatus to which the technique of the present disclosure is applicable include facsimile apparatuses and multifunctional apparatuses including the image reading apparatus 201. In addition, an image forming unit incorporated in the image forming apparatus is not limited to an electrophotographic system, and the image forming apparatus may include, for example, a printing unit of an inkjet system.

As illustrated in FIG. 2, the image forming apparatus 200 includes an image forming apparatus body 202 and the image reading apparatus 201 mounted on an upper portion of the image forming apparatus body 202. The image forming apparatus body 202 includes an image forming portion 3 serving as an image forming unit disposed approximately at the center thereof, and a feeding unit for feeding a recording material S including feed cassettes 6 is positioned below the image forming portion 3. As the recording material S, a wide variety of sheets of different sizes and materials such as paper sheets like regular paper sheets and cardboards, plastic films, cloths, surface-treated sheet materials such as coated paper, and sheet materials having irregular shapes such as envelopes and index sheets can be used. The image reading apparatus 201 including image sensors 409 and 410 serving as image reading units for reading an image of a document is provided above the image forming apparatus body 202.

In the image forming apparatus body 202, the image forming portion 3 is configured as a print engine of an electrophotographic system. The image forming portion 3 of the present exemplary embodiment is configured as a tandem-type intermediate transfer system, and includes four image forming units 10Y, 10M, 10C, and 10K and an intermediate transfer belt 23 serving as an intermediate transfer member.

The image forming unit 10Y forms a yellow toner image by an electrophotographic process. That is, a photosensitive drum 11 serving as a photosensitive member rotates, and a charging device 12 uniformly charges the surface of the photosensitive drum 11. A laser scanner 13 irradiates the photosensitive drum 11 with laser light modulated on the basis of image information, and thus draws an electrostatic latent image on the surface of the photosensitive drum 11. A developing unit 14 supplies charged toner particles to the photosensitive drum 11, and thus develops the electrostatic latent image on the surface of the photosensitive drum 11 into a toner image. This toner image is transferred onto the intermediate transfer belt 23 through primary transfer by a primary transfer roller 15. Attached matter such as transfer residual toner remaining on the photosensitive drum 11 without being transferred onto the intermediate transfer belt 23 is removed by a drum cleaner 16. The process described above is performed in parallel by each of the image forming units 10Y to 10K, and toner images of respective colors of yellow, magenta, cyan, and black are formed.

The intermediate transfer belt 23 is rolled around a plurality of rollers including a secondary transfer inner roller 18, and is rotationally driven in a direction following a rotation direction of photosensitive drums 11, that is, a clockwise direction in FIG. 2. Toner images of respective colors formed by the image forming units 10Y to 10K are transferred through primary transfer so as to be superimposed on one another, and thus a full-color toner image is formed on the intermediate transfer belt 23. This toner image is conveyed to a secondary transfer portion formed between the secondary transfer inner roller 18 and a secondary transfer roller 19 opposed thereto by the rotation of the intermediate transfer belt 23.

The image forming apparatus 200 includes a cassette feeding portion 4 and a manual feeding portion 5 as sheet feeding apparatuses for feeding the recording material S. The cassette feeding portion 4 includes the plurality of feed cassettes 6, and the feeding unit 7 feeds the recording material S one by one from one of the feed cassettes 6 toward a registration roller 17. In addition, the manual feeding portion 5 provided on a side portion of the apparatus body 202 feeds the recording material S one by one by a feeding unit 8 toward the registration roller 17. The feeding units 7 and 8 each include a feeding member such as a feed roller that delivers out the recording material S from a feed cassette 6 or a manual feed tray, and a separation member such as a separation roller or a separation pad that applies a frictional force to a sheet of the recording material S superimposed on another sheet of the recording material S conveyed by the feeding member to prevent multiple sheets of the recording material S from being conveyed simultaneously.

The registration roller 17 delivers the recording material S into the secondary transfer portion in synchronization with the formation of the toner image by the image forming portion 3. The recording material S on which the toner image has been transferred from the intermediate transfer belt 23 through secondary transfer in the secondary transfer portion is conveyed to a fixing unit 21. The fixing unit 21 applies heat and pressure to the toner image on the recording material S while nipping and conveying the recording material S, and thus fixes the toner image to the recording material S. In the case of duplex printing, the recording material S having passed through the fixing unit 21 is guided to a reverse conveyance path 26, switched back, and conveyed to the image forming portion 3 in a state in which a first surface and a second surface thereof are reversed, and an image is formed on the second surface of the recording material S. In the case of simplex printing and in the case where image formation on the second surface in the duplex printing is finished, the recording material S having passed through the fixing unit 21 is discharged from the apparatus body 202 by a discharge roller 25.

To be noted, FIG. 2 illustrates a configuration in which the recording material S on which an image has been formed is discharged onto a discharge tray disposed on a side surface of the image forming apparatus body 202 or onto a sheet processing apparatus connected to the image forming apparatus body 202. Instead of this, a so-called in-body discharge configuration in which a space is provided between the image reading apparatus 201 and the image forming apparatus body 202 in the gravity direction to form a body discharge portion onto which a recording material having undergone image formation in the image forming apparatus body 202 is discharged may be employed.

Image Reading Apparatus

Next, a schematic configuration of the ADF 300 and the reader portion 301 constituting the image reading apparatus 201 will be described with reference to FIG. 3.

As illustrated in FIG. 3, the image reading apparatus 201 includes the ADF 300 that feeds a plurality of documents one by one by separating one document from another for reading an image on the document by an image sensor while conveying the document. As the document, a wide variety of sheets of different sizes and materials such as paper sheets like regular paper sheets and cardboards, plastic films, cloths, sheet materials whose surface is treated such as coated paper, and sheet materials having irregular shapes such as envelopes and index sheets can be used. In particular, in the present exemplary embodiment, sheets of a small size that is conventionally hardly handled by an ADF, for example, business cards, can be conveyed by the ADF 300.

The ADF 300 includes a feed tray 302 on which documents are placed, and a discharge tray 303 serving as a stacking portion onto which documents whose images have been read are discharged and on which the discharged documents are stacked. The reader portion 301 for reading an image of a document conveyed by the ADF 300 or an image of a still document, for example, a thick document such as a book, is provided below the ADF 300.

In the description below, as illustrated in FIG. 3, the left-right direction of the image reading apparatus 201 as viewed from a user, that is, as viewed from the front side of the image forming apparatus 200, will be referred to as an X direction. The front-rear direction of the image reading apparatus 201 perpendicular to the X direction, that is, the main scanning direction or width direction of documents, will be referred to as a Y direction. In addition, the up-down direction of the image reading apparatus 201 perpendicular to both of the X direction and the Y direction, that is, the gravity direction in normal use, will be referred to as a Z direction. The ADF 300 feeds a document placed on the feed tray 302 toward one side in the X direction, and discharges the document toward the other side in the X direction, that is, in a sheet discharge direction of the present exemplary embodiment, onto the discharge tray 303.

Next, the inner structure of the image reading apparatus 201 will be described with reference to FIG. 4, which is a section view of the image reading apparatus 201 as viewed in the Y direction. The ADF 300 includes a pickup roller 401, a separation roller pair 402, and a plurality of roller pairs 403 to 406 as a plurality of conveyance units that convey a sheet. The pickup roller 401 abuts the uppermost document among documents 400 placed on the feed tray 302, and sends out the uppermost document toward the separation roller pair 402. The separation roller pair 402 separates one document 400 from a plurality of documents 400 when a plurality of documents 400 are received from the pickup roller 401, and conveys the separated document 400.

The plurality of conveyance roller pairs convey the document 400 through a reading position while passing the document 400 onto one another. In this case, the reading position is a position where the image sensors 409 and 410 scan the document 400. Among these conveyance roller pairs, a pulling roller pair 403 conveys the document 400 while pulling out the document 400 from the separation roller pair 402. A first reading roller pair 404 and a second reading roller pair 405 convey the document 400 such that the document 400 passes through the reading position while stabilizing the position of the document 400 at the reading position so as to improve the reading precision. A discharge roller pair 406 receives the document 400 having passed through the reading position and discharges the document 400 onto the discharge tray 303.

The image sensor 409 serving as a first reading unit is provided in the reader portion 301. When reading an image from a first surface of the document 400 conveyed by the ADF 300, the image sensor 409 stops at a position where the image sensor 409 opposes a document feeding-reading glass 407, that is, at a position illustrated in FIG. 4. When reading an image from a still document placed on a platen glass 408, the image sensor 409 reads the image while moving on a rail provided in the reader portion 301 in the X direction, which is a sub-scanning direction.

Further, an image sensor 410 serving as a second reading unit is provided in the ADF 300 at a position opposing the image sensor 409 of the reader portion 301. Therefore, images on both surfaces of the document 400 conveyed by the ADF 300 can be simultaneously read by using the two image sensors 409 and 410. To be noted, as the image sensors 409 and 410, a contact image sensor: CIS, which is a module of an image sensor such as a complementary metal oxide semiconductor: CMOS and an equal-magnification optical system, and a CCD-type image sensor in which a charge-coupled device: CCD and a reduced optical system are combined can be both used.

As described above, the ADF 300 serving as a sheet discharging apparatus of the present exemplary embodiment has a function of discharging a document whose image has been read onto the discharge tray 303 by the discharge roller pair 406 serving as a discharge unit.

Discharge Tray

Figure 5:
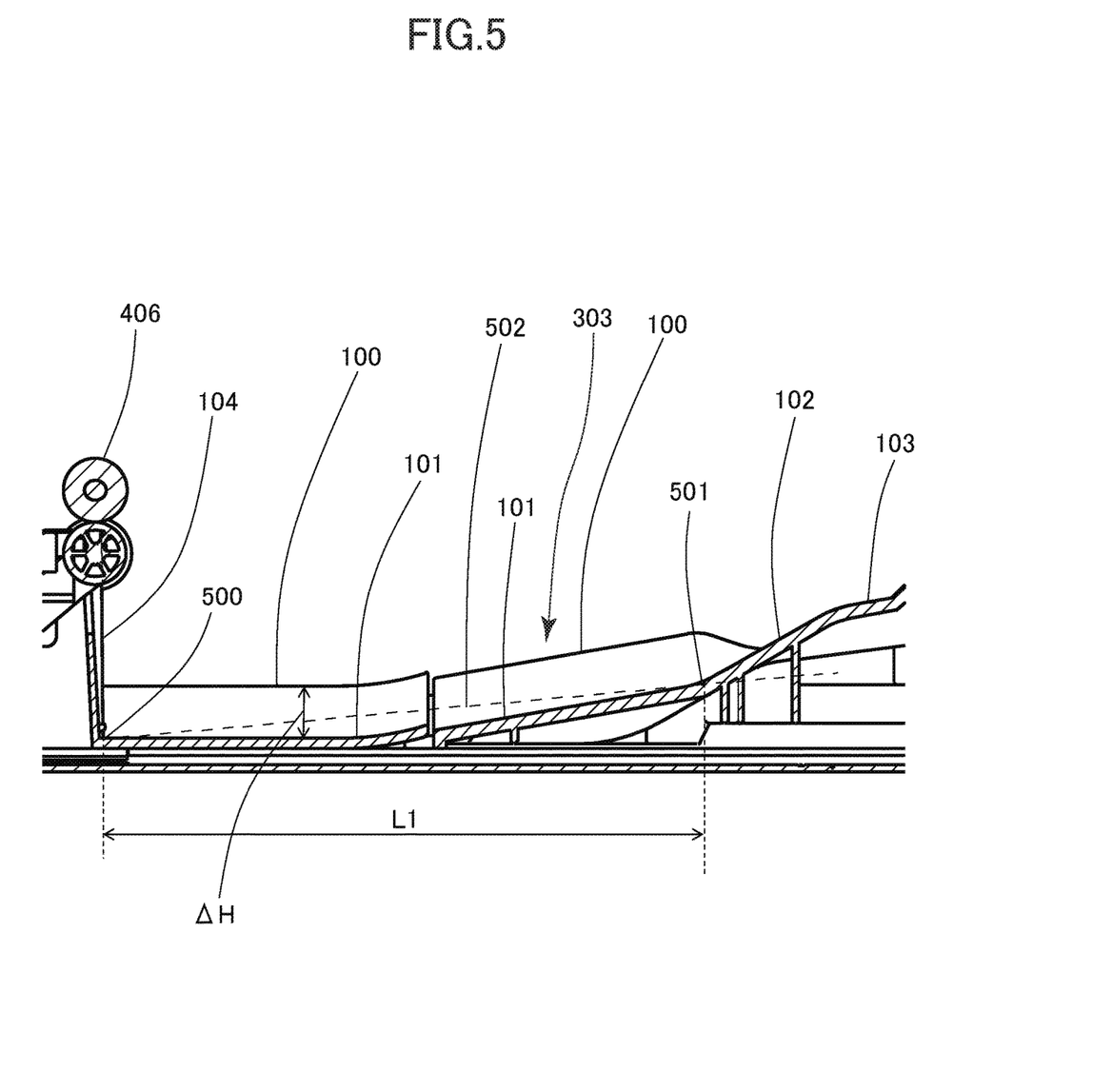
FIG. 5 is a section view of a discharge tray according to the exemplary embodiment.
Figure 6:
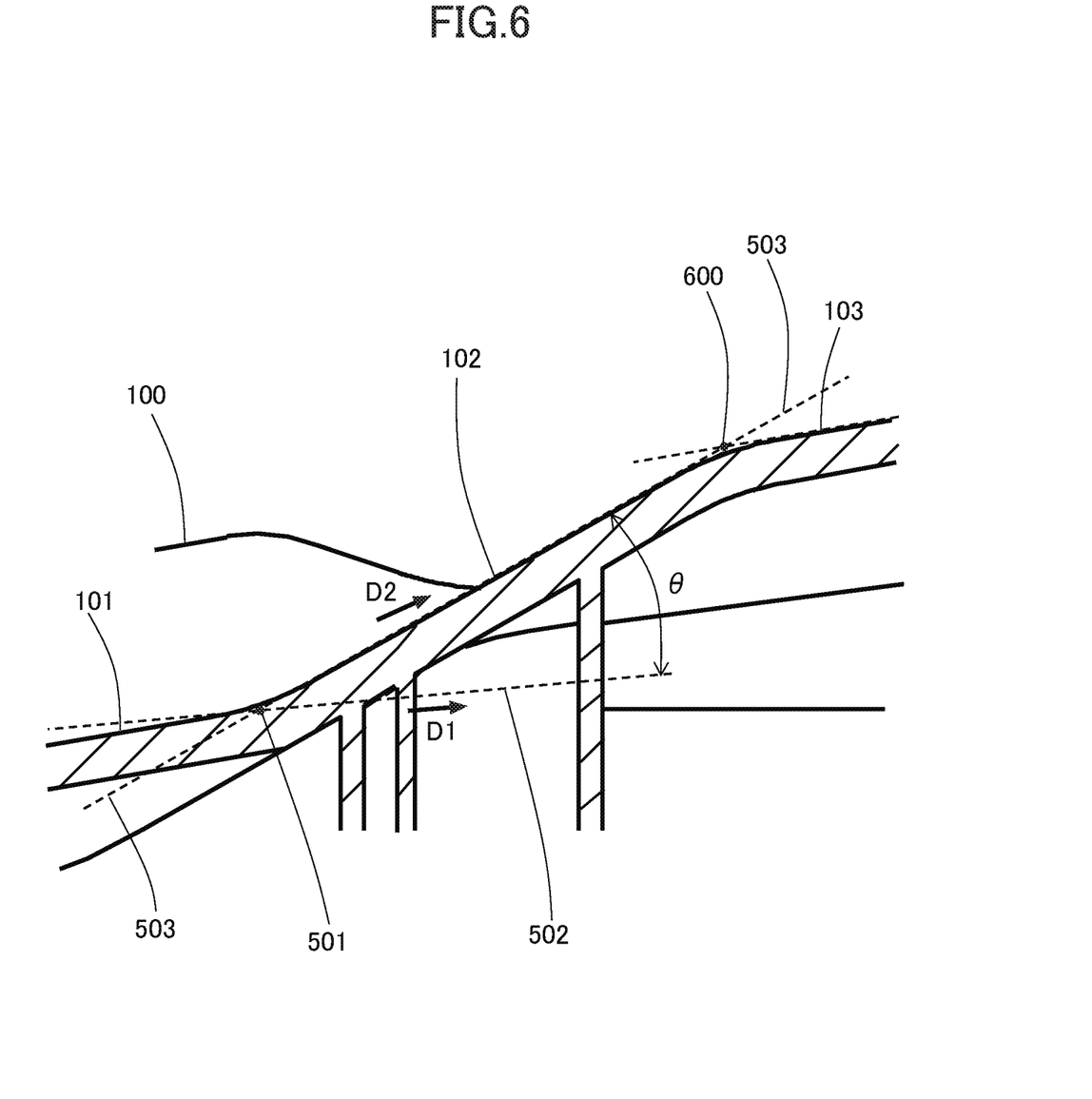
FIG. 6 is a section view of the discharge tray according to the exemplary embodiment.
Figure 7:
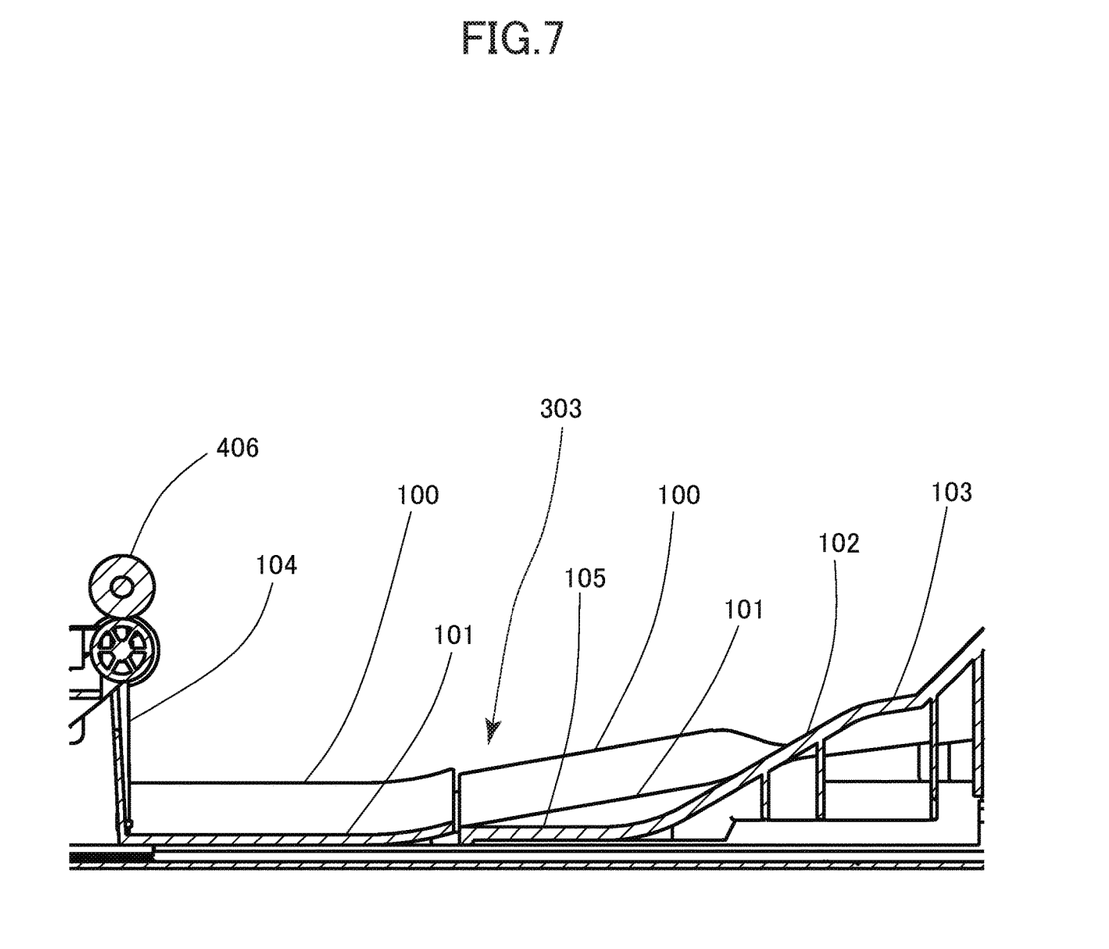
FIG. 7 is a section view of the discharge tray according to the exemplary embodiment.
Figure 8:
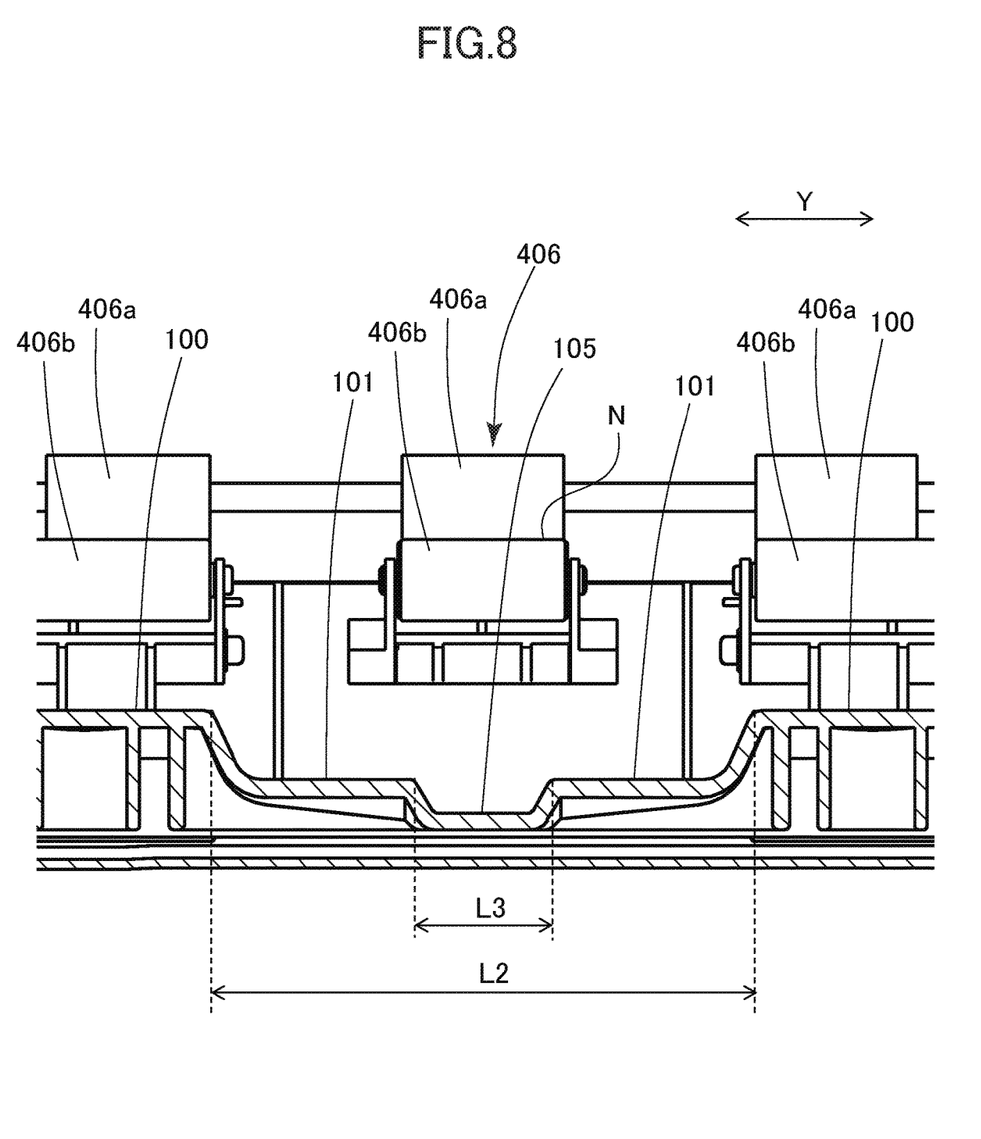
FIG. 8 is a section view of the discharge tray according to the exemplary embodiment illustrating a recess portion.

Next, the configuration of the discharge tray 303 of the ADF 300 according to the present exemplary embodiment will be described in detail with reference to FIGS. 1 and 5 to 8. FIG. 5 is a section view of the discharge tray 303 illustrating a configuration thereof. FIG. 6 is an enlarged view of a third supporting surface 102 of the discharge tray 303 illustrating a configuration thereof. FIGS. 7 and 8 are each a section view of the discharge tray 303 illustrating a configuration of a recess portion provided in the discharge tray 303.

As illustrated in FIG. 5, a wall surface portion 104 erecting upward in the Z direction is formed at an upstream end of the discharge tray 303 in a discharge direction of sheets, which is rightward in FIG. 5, and a first supporting surface 100 for supporting a document of a regular size thereon extends in the X direction from a lower portion of the wall surface portion 104. Here, examples of the regular size include LTR (letter), LGL (legal), STMT (statement), and 16 K sizes in addition to A sizes (A6/A5/A4/A3) and B sizes (B6/B5/B4/B3) that can be conveyed by a sheet conveyance apparatus. In the case where a document of a regular size is discharged, the document is supported on the first supporting surface 100 of the discharge tray 303.

In addition, a second supporting surface 101 for supporting a sheet of a size smaller than the regular size such as a business card thereon also extends in the X direction from a lower portion of the discharge tray 303. Hereinafter, the sheet of a size smaller than the regular size will be referred to as a small size sheet. As illustrated in FIG. 1, the positions of the first supporting surface 100 and the second supporting surface 101 in the X direction at least partially overlap with each other. In the present exemplary embodiment, these positions overlap with each other approximately entirely. The second supporting surface 101 is provided at a center portion in the Y direction, and the first supporting surface 100 is divided into a first part 100a and a second part 100b in the Y direction by the second supporting surface 101. The first supporting surface 100 is a first supporting portion of the present exemplary embodiment that supports a first sheet having a width larger than an interval between the first part 100a and the second part 100b, for example, a document of an A6 size. In addition, the second supporting surface 101 is a second supporting portion of the present exemplary embodiment that supports a second sheet having a width smaller than the interval between the first part 100a and the second part 100b, for example, a business card.

Here, as illustrated in FIGS. 5 and 8, the second supporting surface 101 is provided at a position lower than the first supporting surface 100 in the Z direction. Therefore, the small size sheet discharged onto the discharge tray 303 is normally supported on the second supporting surface 101. In contrast, in the case where a sheet of a regular size is discharged, the sheet is supported on the first supporting surface 100 without contacting the second supporting surface 101.

A height difference $\Delta H$ between the first supporting surface 100 and the second supporting surface 101 is 10 mm in the present exemplary embodiment. This is such a height difference that, even when 30 business cards having a grammage of 207 gsm, which is a typical grammage of a business card, are stacked, the upper surface of the 30 business cards supported on the second supporting surface 101 is not higher than the first supporting surface 100. As a result of providing this height difference $\Delta H$, good alignment of business cards supported on the discharge tray 303 can be maintained at least when 30 typical business cards are set on the feed tray 302 and reading operation is continuously performed. The height difference $\Delta H$ may be set to a larger value in the case where it is desired that the alignment is guaranteed for a larger number of sheets, and $\Delta H$ may be set to a smaller value in the case where the number of sheets that can be supported on the second supporting surface 101 may be smaller than 30.

As illustrated in FIG. 5, a third supporting surface 102 is provided adjacent to and downstream of the second supporting surface 101 in the discharge direction of documents, and a fourth supporting surface 103 is further provided downstream of the third supporting surface 102. The downstream side in the document discharge direction is the right side in FIG. 5. The third supporting surface 102 and the fourth supporting surface 103 are each inclined with respect to the horizontal direction such that a more downstream portion thereof is higher in the Z direction. The inclination angle of the third supporting surface 102 with respect to the horizontal direction is larger than the inclination angle of the second supporting surface 101, and the inclination angle of the fourth supporting surface 103 with respect to the horizontal direction is larger than the inclination angle of the third supporting surface 102. Therefore, as viewed in the width direction of sheets, the third supporting surface 102 is inclined upward toward the downstream side in the discharge direction with respect to an extension line of the second supporting surface 101 as illustrated in FIG. 6. In addition, the fourth supporting surface 103 is inclined downward toward the downstream side in the discharge direction with respect to an extension line of the third supporting surface 102. That is, the fourth supporting surface 103 extends to a region below an extension line of the third supporting surface 102.

In the description below, as viewed in the Y direction, a point where the second supporting surface 101 and the wall surface portion 104 intersect is defined as a first intersection point 500, a point where the second supporting surface 101 and the third supporting surface 102 intersect is defined as a second intersection point 501, and a point where the third supporting surface 102 and the fourth supporting surface 103 intersect is defined as a third intersection point 600. However, as illustrated in FIG. 6, each intersection point is not necessarily present on the surface of the discharge tray 303 as can be seen from, for example, the fact that the third supporting surface 102 and the fourth supporting surface 103 are smoothly connected to each other via a curved surface without directly intersecting with an angle therebetween. That is, each intersection point is an intersection point of virtual straight lines drawn along two adjacent surfaces, and may be a virtual point. Actually, in the present exemplary embodiment, the second intersection point 501 is an intersection point of an extension line of the second supporting surface 101 and an extension line of the third supporting surface 102, and the third intersection point 600 is an extension line of the third supporting surface 102 and an extension line of the fourth supporting surface 103.

Here, a straight line connecting the first intersection point 500 and the second intersection point 501 is defined as a first straight line 502, and a straight line connecting the second intersection point 501 and the third intersection point 600 is defined as a second straight line 503. In the present exemplary embodiment, the second supporting surface 101 and the third supporting surface 102 are disposed such that an angle θ formed by the first straight line 502 and the second straight line 503 is an acute angle, that is, $0° < θ < 90°$ holds. To be noted, the "angle θ formed by the first straight line 502 and the second straight line 503" is an angle between a first direction D1 from the first intersection point 500 toward the second intersection point 501 and a second direction D2 from the second intersection point 501 toward the third intersection point 600.

As described above, as a result of providing the third supporting surface 102 downstream of the second supporting surface 101 in the discharge direction such that the angle θ formed by the first straight line 502 and the second straight line 503 is an acute angle, a leading end portion of a small size sheet discharged from the discharge roller pair 406 comes into contact with the third supporting surface 102. Therefore, further downstream movement of the small size sheet in the discharge direction is prevented, and thus the alignment of the small size sheet in the discharge direction can be improved. In particular, the alignment of the small size sheet in the discharge direction can be maintained even in the case where the conveyance speed of a sheet in the ADF 300 is higher than 340 mm/s, for example, in the case where the conveyance speed is 400 mm/s or higher.

In addition, in the case of a regular size sheet, as a result of the angle θ formed by the first straight line 502 and the second straight line 503 being an acute angle, the leading end portion of the sheet in the discharge direction is not caught by the third supporting surface 102, and slides on the upper surface of the third supporting surface 102. Therefore, according to the configuration of the present exemplary embodiment, regular size sheets can be stacked on the first supporting surface 100 and the third supporting surface 102 while small size sheets are stacked on the second supporting surface 101 incorporated in the discharge tray 303.

To be noted, as illustrated in FIG. 5, the second supporting surface 101 of the present exemplary embodiment extends approximately in the horizontal direction on the upstream side in the discharge direction, and extends in a direction slightly inclined with respect to the horizontal direction on the downstream side in the discharge direction. The first straight line 502 connecting the first intersection point 500 and the second intersection point 501 does not coincide with the upstream portion and downstream portion of the second supporting surface 101. In contrast, since the sheet supporting surface of the third supporting surface 102 is formed as one flat surface, the third supporting surface 102 coincides with the second straight line 503. However, this is a description corresponding to the configuration of the present exemplary embodiment, and a configuration in which the third supporting surface 102 is made up of a curved surface or a combination of a plurality of flat surfaces of different angles and the third supporting surface 102 does not coincide with the second straight line 503 may be employed. That is, a surface that is inclined upward with respect to a second supporting surface, on which a small size sheet is supported, on the downstream side of the second supporting surface and that regulates downstream movement of the small size sheet in the discharge direction functions as a third supporting surface regardless of whether or not the surface is formed as a single flat surface.

In addition, the discharge tray 303 of the present exemplary embodiment may be made up of a combination of a plurality of members as long as a regular size sheet can be supported thereon without detaching the second supporting surface 101 from the discharge tray 303. Actually, in the present exemplary embodiment, an upstream portion of the first supporting surface 100 and the second supporting surface 101 in the discharge direction is integrally molded with a member holding the discharge roller pair 406. In addition, a downstream portion of the first supporting surface 100 and the second supporting surface 101 in the discharge direction, the third supporting surface 102, the fourth supporting surface 103, and a portion of the discharge tray 303 further downstream of the fourth supporting surface 103 in the discharge direction are molded as a single body member.

Size of Second Supporting Surface

Next, the size of the second supporting surface 101 will be described with reference to FIGS. 5 and 8. As described above, in the present exemplary embodiment, it is attempted to simultaneously achieve alignment of small size sheets smaller than regular size sheets and alignment of documents of regular size. Therefore, the size of the second supporting surface 101 on which small size sheets are supported is determined on the basis of a relationship between the assumed size of small size sheets and the size of document of the smallest regular size to be supported on the first supporting surface 100.

Among documents of regular size that can be conveyed by the ADF 300, the smallest document is document of an A6 size conveyed in a longitudinal direction (length in the main scanning direction: 105 mm, length in the conveyance direction: 148 mm), that is, a document of an A6 size is conveyed such that a long side thereof is parallel to the conveyance direction. Meanwhile, as small size sheets, specifically, conveyance of business cards is assumed. As the largest size of business cards, Japanese Standard Size 4 (length in the main scanning direction: 55 mm, length in the conveyance direction: 91 mm) is known.

Therefore, a length L1 [mm] in the X direction from the wall surface portion 104 to the second intersection point 501 where the second supporting surface 101 and the third supporting surface 102 intersect (see FIG. 5) is set to 91 mm or more and less than 148 mm. That is, $91<L1<148$ holds. As a result of this, the leading end portion of a small size sheet discharged onto the discharge tray 303 by the discharge roller pair 406 can be brought into contact with the third supporting surface 102, and thus good alignment thereof in the X direction can be achieved.

In addition, a length L2 [mm] of the second supporting surface 101 in the Y direction, that is, the width direction of sheets (see FIG. 8), is set to 55 mm or more and less than 105 mm as illustrated in FIG. 8. That is, $55 \leq L2<105$ holds. As a result of this, a small size sheet discharged onto the discharge tray 303 by the discharge roller pair 406 can be supported on the second supporting surface 101 without being caught by the first supporting surface 100.

By defining the size of the second supporting surface 101 in this manner, documents of regular size can be supported on the first supporting surface 100, and sheets of small size smaller than the regular size can be supported on the second supporting surface 101 without using a detachable sub tray.

Removal of Small Size Sheets

Next, removability of small size sheets will be described with reference to FIGS. 1, 7, and 8. In the configuration of the present exemplary embodiment, the recess portion 105 that facilitates removal of small size sheets is provided on the second supporting surface 101 on which small size sheets are supported. As illustrated in FIGS. 7 and 8, the recess portion 105 is configured to be lower than the second supporting surface 101 in the Z direction, and is defined as a groove shape extending in the X direction. To be noted, FIG. 7 is a section view of the discharge tray 303 as viewed in the Y direction taken along a cutting line passing through the recess portion 105, and FIG. 5 is a section view taken along a different cutting line.

As described above, by providing the recess portion 105 on the second supporting surface 101, a space for a fingertip to get into can be provided below a small size sheet supported on the second supporting surface 101, and thus it becomes easier to remove the small size sheet. To be noted, the shape of the recess portion 105 is not limited to this, and may be, for example, a shape extending in the Y direction, that is, a shape extending toward the front side of the image forming apparatus, from the inside toward the outer peripheral edge of the second supporting surface 101.

As illustrated in FIG. 8, a length L3 [mm] of the recess portion 105 in the Y direction is set to be smaller than 39 mm, which is the width of Japanese Small Size 4 (length in the main scanning direction: 39 mm, length in the conveyance direction: 70 mm), which is the smallest assumed size of business cards. In addition, the minimum value of L3 is set to 15 mm in consideration of the width of a human finger. That is, $15 \leq L3<39$ holds. As a result of this, small size sheets can be easily removed while preventing the small size sheets from falling into the recess portion 105, and thus the usability can be improved.

It is preferable that the recess portion 105 is provided so as to cover a range from the leading end position of a business card of the smallest assumed size to the leading end position of a business card of the largest assumed size with respect to the wall surface portion 104. That is, when Standard Size 4 is set as the maximum size and Small Size 4 is set as the minimum size, it is preferable that the recess portion 105 is provided in at least "a range from a position in a distance of 70 mm from the wall surface portion 104 to a position in a distance of 91 mm from the wall surface portion 104". As a result of this, the user can easily pick up a small size sheet by putting a finger into the recess portion 105 while pushing the small size sheet against the wall surface portion 104 in a state in which the small size sheet is supported on the second supporting surface 101.

Conveyance of Small Size Sheet by ADF

The ADF 300 including the discharge tray 303 described above further has a configuration as described below in terms of arrangement of components inside the ADF 300 and the discharge roller pair 406 for conveying small size sheets such as business cards.

As illustrated in FIG. 8, the discharge roller pair 406 includes driving rollers including roller bodies 406a provided at a plurality of positions in the Y direction, that is, the width direction of sheets, and rolling members 406b that respectively abut the roller bodies 406a of the driving rollers. In addition, at least one pair of a roller body 406a and a rolling member 406b abutting this roller body 406a serving as a pair of roller members are provided within the range of the second supporting surface 101 in the Y direction, more preferably at a center position of the second supporting surface 101 in the Y direction. That is, at least part of the nip portion N of the discharge roller pair 406 for nipping and conveying a sheet is positioned within a range where a second supporting portion is provided in the Y direction. As a result of this configuration, a small size sheet having a width smaller than that of the regular size can be stably discharged by the discharge roller pair 406.

In also each of the other conveyance roller pairs 402, 403, 404, and 405 provided in the ADF 300 illustrated in FIG. 4, at least one pair of roller members is provided within the range of the second supporting surface 101 in the Y direction similarly to the discharge roller pair 406. That is, each conveyance unit includes a roller member that abuts and conveys a sheet, and at least part of a contact portion of the roller member with the sheet is provided within a range where a second supporting portion is provided in the Y direction. In addition, the conveyance roller pairs 402 to 406 including the discharge roller pair 406 are arranged such that intervals therebetween in the sheet conveyance direction are each equal to or smaller than the length of the small size sheet of the smallest assumed size, which is 70 mm in the case of Small Size 4, that is, equal to or smaller than the length of the second supporting surface 101 in the sheet discharge direction. As a result of this configuration, a series of operation of sequentially feeding small size sheets placed on the feed tray 302 and having a size smaller than the regular size one by one, reading image information thereof, and stacking the small size sheets on the second supporting surface 101 of the discharge tray 303 can be performed.

To be noted, as illustrated in FIGS. 1 and 4, a rib 108 projecting upward is provided further downstream of the fourth supporting surface 103 in the discharge direction. In addition, a swing guide 411 is attached to a lower surface of the feed tray 302 provided above the discharge tray 303. The swing guide 411 dangles to a position overlapping with the rib 108 as illustrated in FIG. 4 in a state in which no document is supported on the discharge tray 303. When a document having a length equal to or larger than a certain value in the discharge direction is discharged, the swing guide 411 is pushed by the document and swings upward.

As described above, the downstream side in the discharge direction of a space above the second supporting surface 101 on which small size sheets are supported is closed by an upward projection made up of the third supporting surface 102, the fourth supporting surface 103, and the rib 108, and by the swing guide 411 dangling from above. In addition, at least part of the rib 108 and at least part of the swing guide 411 are positioned within the range where the second supporting surface 101 is provided in the Y direction. Therefore, even if the discharge roller pair 406 quickly discharges a small size sheet at a speed higher than 340 mm/s, movement of the sheet is stopped by the projection and the swing guide 411, and the small size sheet can be moved back onto the second supporting surface 101 along the slope of the projection.

Other Embodiments

The first supporting surface 100 of the above exemplary embodiment is provided as a flat surface formed in an upper portion of the discharge tray 303, and the entirety of the first supporting surface 100 functions as a first supporting portion configured to support a sheet. However, instead of providing a flat surface like this, a regular size sheet may be supported by, for example, providing a plurality of rib shapes extending parallel to the discharge direction. In this case, an upper end portion of a rib that comes into contact with the lower surface of the regular size sheet serves as the first supporting portion. Similarly, as the second supporting portion, the third supporting portion, and the fourth supporting portion, shapes other than surfaces, such as rib shapes, may be provided instead of flat surfaces exemplified by the second supporting surface 101, the third supporting surface 102, and the fourth supporting surface 103.

In addition, although a case where the technique of the present disclosure is applied to a sheet discharging configuration of an ADF has been described in the exemplary embodiment described above, the technique of the present disclosure is also applicable to sheet discharging apparatuses other than the ADF, for example, to apparatuses that discharge a recording material on which an image has been formed by an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-102797, filed on May 31, 2019, which is hereby incorporated by reference herein in its entirety.

What is claimed is:

1. A sheet discharging apparatus comprising:
a discharge unit configured to discharge a sheet in a discharge direction; and
a stacking portion on which sheets discharged by the discharge unit are stacked,
wherein the stacking portion comprises:
a first supporting portion comprising a first part and a second part provided with an interval therebetween in a width direction of the sheets, and configured to support a first sheet having a width in the width direction larger than the interval between the first part and the second part, the width direction intersecting with the discharge direction; and
a second supporting portion provided at a position between the first part and the second part in the width direction and below the first supporting portion in a gravity direction, and configured to support a second sheet having a width in the width direction smaller than the interval between the first part and the second part, and
wherein the second supporting portion includes a recess portion where the second supporting portion is recessed in the gravity direction to be lower than a height at which the second supporting portion comes into contact with a lower surface of the second sheet.

2. The sheet discharging apparatus according to claim 1, wherein the stacking portion comprises a third supporting portion provided downstream of the second supporting portion in the discharge direction and inclined upward toward a downstream side in the discharge direction with respect to an extension line of the second supporting portion.

3. The sheet discharging apparatus according to claim 2, further comprising a wall surface portion erecting upward from an upstream end of the second supporting portion in the discharge direction,
wherein the stacking portion comprises a fourth supporting portion provided downstream of the third supporting portion in the discharge direction and extending to a region below an extension line of the third supporting portion as viewed in the width direction, and
wherein as viewed in the width direction, an angle between a first direction and a second direction is an acute angle,
the first direction being a direction from a first intersection point to a second intersection point, the first intersection point being an intersection point of the wall surface portion and the second supporting portion, the second intersection point being an intersection point of the second supporting portion and the third supporting portion,
the second direction being a direction from the second intersection point to a third intersection point, the third intersection point being an intersection point of the third supporting portion and the fourth supporting portion.

4. The sheet discharging apparatus according to claim 1, wherein the discharge unit comprises a roller pair configured to abut each other to form a nip portion for nipping and conveying a sheet, and at least part of the nip portion is positioned within a range where the second supporting portion is provided in the width direction.

5. The sheet discharging apparatus according to claim 1, further comprising a conveyance unit provided upstream of the discharge unit in the discharge direction and configured to convey a sheet toward the discharge unit, wherein an interval between the conveyance unit and the discharge unit is smaller than a length of the second supporting portion in the discharge direction.

6. The sheet discharging apparatus according to claim 1, wherein the recess portion is a groove shape having a width equal to or larger than 15 mm and smaller than 39 mm in the width direction.

7. The sheet discharging apparatus according to claim 6, further comprising a wall surface portion erecting upward from an upstream end of the second supporting portion in the discharge direction,
wherein the recess portion is a groove shape extending in the discharge direction and defined to cover a range from a position at a distance of 70 mm from the wall surface portion in the discharge direction to a position at a distance of 91 mm from the wall surface portion in the discharge direction.

8. The sheet discharging apparatus according to claim 1, wherein a width of the second supporting portion in the width direction is equal to or larger than 55 mm and smaller than 105 mm.

9. The sheet discharging apparatus according to claim 1, wherein a length of the second supporting portion in the discharge direction is equal to or larger than 91 mm and smaller than 148 mm.

10. The sheet discharging apparatus according to claim 1, wherein a sheet conveyance speed of the discharge unit is higher than 340 mm/s.

11. An image reading apparatus comprising:
a feed tray on which a sheet is supported;
a conveyance unit configured to convey the sheet supported on the feed tray;
an image reading unit configured to read an image of the sheet conveyed by the conveyance unit at a reading position; and
the sheet discharging apparatus according to claim 1 configured to discharge the sheet having passed the reading position.

12. The image reading apparatus according to claim 11, wherein the conveyance unit is one of a plurality of conveyance units provided along a conveyance path from the feed tray to the discharge unit, and
wherein each of the plurality of conveyance units comprises a roller member configured to abut and convey the sheet, and at least part of a contact portion of the roller member with the sheet is positioned within a range where the second supporting portion is provided in the width direction.

13. The image reading apparatus according to claim 11, wherein the conveyance unit is one of a plurality of conveyance units provided along a conveyance path from the feed tray to the discharge unit, and
wherein any interval between two adjacent conveyance units among the plurality of conveyance units in a direction along the conveyance path is smaller than a length of the second supporting portion in the discharge direction.

14. An image forming apparatus comprising:
the image reading apparatus according to claim 11; and
an image forming unit configured to form an image on a sheet.

* * * * *